United States Patent [19]

Leininger et al.

[11] Patent Number: 4,509,114
[45] Date of Patent: Apr. 2, 1985

[54] MICROWORD CONTROL MECHANISM UTILIZING A PROGRAMMABLE LOGIC ARRAY AND A SEQUENCE COUNTER

[75] Inventors: Joel C. Leininger, Boca Raton; Victor S. Moore, Pompano Beach; William L. Stahl, Jr., Coral Springs, all of Fla.

[73] Assignee: International Business Machines Corporation, Armonk, N.Y.

[21] Appl. No.: 350,662

[22] Filed: Feb. 22, 1982

[51] Int. Cl.³ .............................................. G06F 9/22
[52] U.S. Cl. .................................................. 364/200
[58] Field of Search ... 364/200 MS File, 900 MS File

[56] References Cited

U.S. PATENT DOCUMENTS

| 3,736,567 | 5/1973 | Lotan et al. ...................... 340/172.5 |
| 4,106,090 | 8/1978 | Erickson et al. ..................... 364/200 |
| 4,156,900 | 5/1979 | Gruno et al. ......................... 364/200 |
| 4,195,352 | 3/1980 | Tu et al. .............................. 364/900 |
| 4,354,228 | 10/1982 | Moore et al. ....................... 364/200 |
| 4,392,198 | 7/1983 | Shimazaki ........................... 364/200 |

FOREIGN PATENT DOCUMENTS 2349177 11/1977 France .

OTHER PUBLICATIONS

Adams et al., "How Bit-Slice Families Compare: Part 2, Sizing Up the Microcontrollers", Electronics, Aug. 17, 1978, pp. 96–102.

Cook et al., "A Study in the Use of PLA-Based Macros", IEEE Journal of Solid-State Circuits, vol. SC-14, No. 5, Oct. 1979, pp. 833–840.

Manning et al., "Microprogrammed Processor Having PLA Control Store", IBM Technical Disclosure Bulletin, vol. 22, No. 6, Nov. 1979, pp. 2440–2441.

Primary Examiner—Raulfe B. Zache
Attorney, Agent, or Firm—Richard E. Bee

[57] ABSTRACT

A microword control mechanism is provided for producing the sequences of microwords used to control the execution of processor instructions in a microprogrammed data processor. This microword control mechanism includes circuitry (15, 20) responsive to a processor instruction to be executed for providing an instruction dependent signal uniquely representative of such instruction. This microword control mechanism also includes sequence counter circuitry (18) for supplying a sequence of number signals. This microword control mechanism further includes a programmable logic array (17) responsive to the instruction dependent signal and to the sequence of number signals for producing a sequence of microwords needed to execute the processor instruction.

22 Claims, 8 Drawing Figures

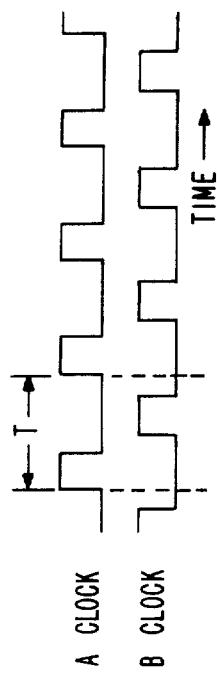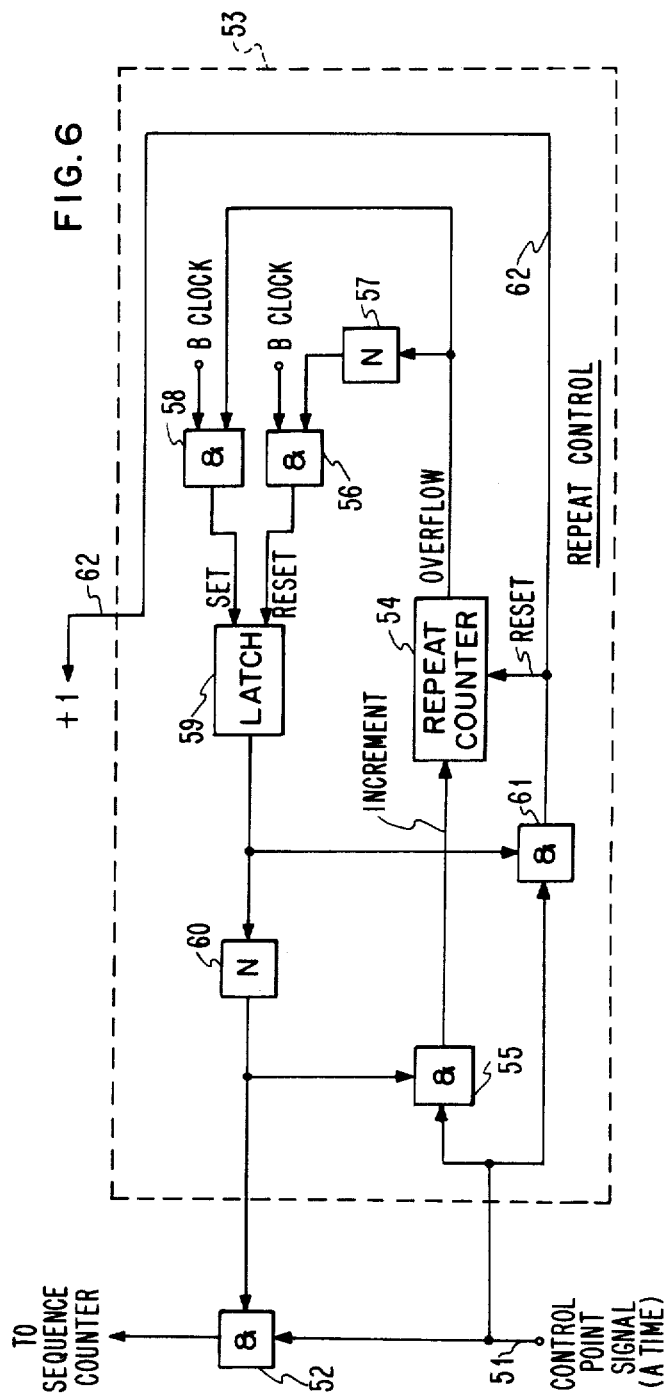

MICROWORD CONTROL MECHANISM UTILIZING A PROGRAMMABLE LOGIC ARRAY AND A SEQUENCE COUNTER

DESCRIPTION

Cross-Reference To Related Applications

The present patent application is related to the following copending patent applications:
(1) application Ser. No. 350,660, filed Feb. 22, 1982, entitled "Microword Control System Utilizing Multiplexed Programmable Logic Arrays", the inventors being Victor S. Moore et al;
(2) application Ser. No. 350,663, filed Feb. 22, 1982, entitled "Microword Generation Mechanism Utilizing Separate Programmable Logic Arrays For First and Second Microwords", the inventors being Joseph C. Rhodes, Jr. et al;
(3) application Ser. No. 334,185, filed Dec. 24, 1981, entitled "Large Scale Integration Data Processor Signal Transfer Mechanism", the inventors being Virgil D. Wyatt et al;
(4) application Ser. No. 350,683, filed Feb. 22, 1982, entitled "Clocking Mechanism For Multiple Overlapped Dynamic Programmable Logic Arrays Used In A Digital Control Unit", the inventors being Gerard A. Veneski et al;
(5) application Ser. No 350,682, filed, Feb. 22, 1982, entitled "Microcode Control Mechanism Utilizing Programmable Microcode Repeat Counter", the inventors being Tony E. Parker et al; and
(6) application Ser. No. 350,681, filed Feb. 22, 1982, entitled "Integrated Circuit Mechanism For Coupling Multiple Programmable Logic Arrays To A Common Bus", the inventors being Wayne R. Kraft et al.

The descriptions set forth in these copending applications are hereby incorporated in the present application by this reference thereto.

TECHNICAL FIELD

This invention relates to microword control mechanisms for use in microprogrammed data processors and digital computers wherein a sequence of microwords are used to control the execution of each processor instruction.

BACKGROUND ART

In a microprogrammed digital computer or data processor, microwords are read from an internal storage unit to provide the internal processor control actions which are needed to execute the processor instructions obtained from the user's software program. The microwords are read from the storage unit and set into a control register one at a time. Each microword consists of multiple binary bits, some or all of which may be organized into plural-bit control groups or fields. The control register drives a decoder mechanism which produces the elemental control point signals which, in turn, control the various data flow gates and data manipulation mechanisms located in the data processor. Each microword controls the internal operation of the data processor for one microword cycle. Several microwords are normally needed to execute each processor instruction. Some processor instructions require only a few microwords, while others require many microwords to complete their execution.

A good example of a microprogrammed data processor is described in U.S. Pat. No. 4,173,041, issued on Oct. 30, 1979, to T. J. Dvorak et al. As indicated in this Dvorak et al patent, the microwords may be located in a separate storage unit called a "control storage" or they may be located in a portion of the processor main storage unit which is set aside for the exclusive use of the microwords. These storage units may be of either the read/write type or of the read only type. In smaller data processors, the current trend is to store the microwords in a so-called read only storage (ROS) unit. In any event, the microword storage units currently used are of the random access type and include the customary addressing circuitry for addressing any desired one of the storage locations in the storage unit.

SUMMARY OF INVENTION

This invention provides an improved microword control mechanism wherein the customary control storage unit and addressing circuitry are replaced by a programmable logic array (PLA) and a sequence counter. The operation code portions of the processor instructions and the sequence counter are used to drive the PLA which, in response to a particular operation code and a particular sequence count, produces a particular microword at its output. In an approximate sense, the PLA "stores" the microwords, while the operation codes and sequence counts provide the "addresses" for selecting the microwords. In effect, the operation code provides the base address and the sequence counter provides a series of displacement addresses for selecting the sequence of microwords needed to execute that particular processor instruction.

This improved microword control mechanism reduces the amount and the complexity of the circuitry needed to produce the microwords. By way of comparison with a conventional storage unit, the PLA does not have to accommodate each address in the overall address range and does not have to provide any hardware for the unaccommodated addresses. This is significant because, in many data processor architectures, there are numerous gaps in the numbering of the effective operation codes. By "effective" operation code is meant all the bits in the processor instruction which are needed to uniquely define the kind of operation to be performed by the processor instruction. This does not include operand address bits and length count bits but does include function bits and modifier bits which are needed to complete the definition of the operation to be performed. Since the PLA does not have to accommodate the unassigned effective operation code numbers, there is a significant savings in the size of the PLA structure as compared to a conventional storage array structure.

Another advantage resulting from the use of a PLA and a sequence counter is that, for similar instructions, the same value of the sequence counter can be used to perform the same elemental operations in the data processor. This further simplifies the control function and further reduces the size of the PLA.

An additional feature of the invention is that the sequence counter may be easily controlled by the output of the PLA to provide additional size and complexity reducing advantages. This is accomplished by setting aside a small number of bits in each microword to provide a counter control field. This field is decoded by the decoder mechanism to produce control point signals which can be used, for example, to cause the sequence counter to skip forward or skip backward a predetermined number of counts or to jump forward or jump backward to a predetermined count value. The skip back and jump back features are particularly useful in that they enable a selected portion of the microword sequence to be repeated one or more times. This repeating or looping action reduces the number of microwords needed and, hence, reduces the size of the PLA. This valuable function is accomplished with very little additional hardware and without need for special microwords or microword branch address fields to set up the looping action.

The skip forward and jump forward features are also useful in various situations. Consider, for example, the case of two somewhat different processor instructions which use the same sequence of microwords, except that one or a few consecutive microwords in the sequence are used by one of the instructions and not by the other. In this case, the skip forward or jump forward feature can be used to omit these microwords for the case of the instruction that does not need them. In this manner the common portions of the microword sequences can be shared by the two instructions, thus reducing the total number of microwords needed.

A further advantage of the invention is the flexibility it provides in handling various kinds of processor instructions. For example, the present invention is very well suited for handling processor instructions having non-regular operation code formats wherein the number and location of the effective operation code bits can vary from instruction to instruction. The PLA can very easily look at different bits in different processor instructions with very little increase in the amount of hardware structure as compared to a processor employing a conventional type of storage unit for the microwords. Thus, the present invention provides the ability to execute complex processor instruction languages with a minimum of increase in the size and complexity of the circuit structures.

The foregoing emphasis on reducing the amount and complexity of the circuitry needed to produce the microwords is of particular importance where the circuits are to be fabricated on semiconductor integrated circuit chips. The smaller the amount of circuitry needed for the microword control mechanism, the greater is the amount of the total data processor that can be fabricated on a single chip. Furthermore, the features which help reduce the size of the PLA also serve to increase the speed of the PLA. In general, the smaller the size of the PLA, the greater is its operating speed.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIG. 5 is a timing diagram used in explaining the operation of the FIG. 4 control mechanism;

FIG. 6 shows in greater detail one form of construction that may be used for the repeat control units of FIG. 4;

DESCRIPTION OF THE FIG. 1 EMBODIMENT

Figure 1:
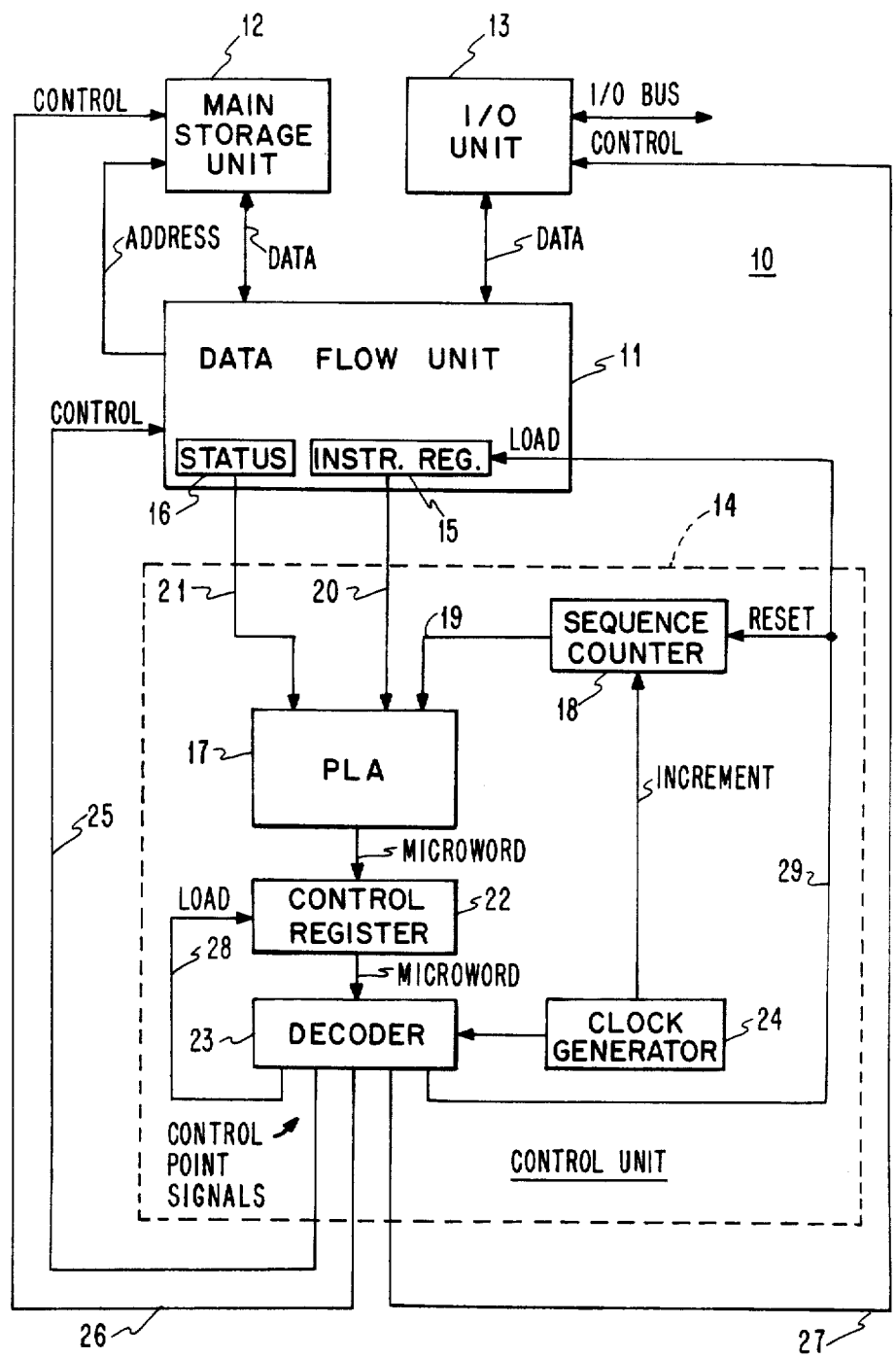
FIG. 1 is a functional block diagram of a data processor having incorporated therein an improved microword control mechanism constructed in accordance with the present invention.

Referring to FIG. 1, there is shown a functional block diagram of a digital computer or data processor 10. This data processor 10 includes a data flow unit 11, a main storage unit 12, an input/output (I/O) unit 13 and a control unit 14. The data flow unit 11 is sometimes called a central processing unit (CPU) and includes such things as an arithmetic and logic unit (ALU), various hardware registers, a local storage unit, a bus system interconnecting these items and various sets of gate circuits associated with the bus system for controlling the movement of data between these units. The data flow unit 11 is the unit that does the adding, subtracting, rearranging and other manipulation of the data to produce the desired results. It also moves data into and out of the main storage unit 12 and to and from the I/O unit 13.

Among other things, the data flow unit 11 includes a plural-bit instruction register 15 into which is loaded a copy of the processor instruction to be executed. These processor instructions are obtained one at a time from the main storage unit 12 and are the instructions which make up the software program being performed by the data processor 10. In some data processors, only a portion of the complete processor introduction may be loaded into the instruction register 15. In such cases, the portion loaded into the instruction register 15 includes at least the effective operation code portion of the instruction. For example, in data processors where the complete instruction may include more than one word, only the first word of the instruction may be loaded into the instruction register 15 where this first word contains the effective operation code.

Also included in the data flow unit 11 is a status register 16 which contains various indicator bits which indicate the status of various conditions in the data flow unit 11. For example, some of these indicator bits indicate whether or not the results of arithmetic operations are even, negative or zero and whether or not the arithmetic operation produced a carry or overflow condition.

The control unit 14 controls the operation of the data flow unit 11, the main storage unit 12 and the I/O unit 13. The control unit 14 is of the microprogrammed type and includes an improved microword control mechanism constructed in accordance with the present invention. This improved microword control mechanism includes a programmable logic array (PLA) 17 and a sequence counter 18. One definition of a PLA is that it is a fixed, orderly structure of logic circuits that can be personalized to perform a specific set of logic equations. Typically, a PLA includes an input AND array connected by a goodly number of product or word lines to an output OR array, with all of this structure being fabricated on the same integrated circuit chip. The sequence counter 18 may take the form of, for example, a plural-bit binary counter for supplying plural-bit binary number signals by way of a plural-bit bus 19 to a first set of inputs for the PLA 17.

The PLA's described in this patent application may be of either the static or dynamic type. For simplicity of explanation, however, they will be spoken of herein as though they were of the static type.

The microword control mechanism further includes circuitry responsive to the processor instruction to be executed for providing an instruction dependent signal uniquely representative of such instruction. In the present embodiment, this circuitry is represented by a plural-bit bus 20 which couples the output of the instruction register 15 to a second set of inputs of the PLA 17. In the present embodiment, the instruction dependent signal supplied by way of the bus 20 includes at least the operation code bits of the instruction in the instruction register 15. A plurality of the status bits in the status register 16 are supplied by way of a plural-bit bus 21 to a third set of inputs of the PLA 17. Buses 19, 20 and 21 are connected to the AND array portion of the PLA 17.

In response to a particular status code on bus 21, a particular operation code on bus 20 and a particular sequence count on bus 19, the PLA 17 produces at its output a particular plural-bit microword. This microword is obtained from the OR array section of the PLA 17.

The control unit 14 further includes primary control circuitry responsive one at a time to the microwords from the PLA 17 for producing for each microword a plurality of control point signals for controlling the operation of the data processor 10 for one microword cycle. In the present embodiment, this primary control circuitry includes a plural-bit control register 22, a decoder 23 and a clock generator 24. The number of bit positions in the control register 22 is the same as the number of bit positions in a single microword. The microword appearing at the output of PLA 17 is loaded into the control register 22 at the end of the preceding microword cycle. The microword residing in control register 22 drives the decoder 23 to cause the decoder 23 to produce the particular control point signals needed for that particular microword.

In general, the microword will include several encoded plural-bit control fields. Decoder 23 decodes these encoded fields to produce the appropriate individual control point signals. Any non-encoded or bit-significant bits in the microword will be supplied straight through by the decoder 23. The clock generator 24 supplied the clock pulses which determine the points in time at which the control point signals actually appear at the output of the decoder 23. In some data processors, there is one clock pulse per microword cycle, while in other processors there are a group of time spaced clock pulses for each microword cycle. Decoder 23 will typically have a relatively large number of control point output lines. In a typical data processor, there may be a hundred or more such output lines. For any given microword, only a relatively small number of these lines, on the order of ten or less, will be activated to produce the desired control actions for that particular microword.

The majority of the control point signals are supplied by a multiconductor control bus 25 to the data flow unit 11 for controlling the various data flow gates, register loading circuits and other elements located in the data flow unit 11. Some control point signals are supplied by way of a plural-bit control bus 26 to the main storage unit 12, while other control point signals are supplied by way of a plural-bit control bus 27 to the I/O unit 13. One of the control point signals is supplied by way of a line 28 to time the loading of the control register 22. Another of the control point signals is supplied by way of a life 29 to control the loading of the instruction register 15 and the resetting of the sequence counter 18.

The control unit 14 further includes circuitry for periodically changing the count in the sequence counter 18 for causing the programmable logic array 17 to produce additional microwords for any given operation code in the instruction register 15. In the present embodiment, this is accomplished by supplying clock pulses from the clock generator 24 to the increment input terminal of the sequence counter 18 for increasing the count in the sequence counter 18 by a value of one count for each microword cycle. The timing is such that immediately after a particular microword is loaded into the control register 22, the sequence counter 18 is incremented by one to enable the PLA 17 to commence producing the next microword. In this manner, the PLA 17 is caused to produce a sequence of microwords for any given operation code residing in the instruction register 15. The last microword in the sequence will cause the control point signal line 29 to be activated to load the next instruction into the instruction register 15 and to reset the sequence counter 18 to an initial starting count which, for sake of explanation, will be assumed to be a count of zero.

Figure 2:
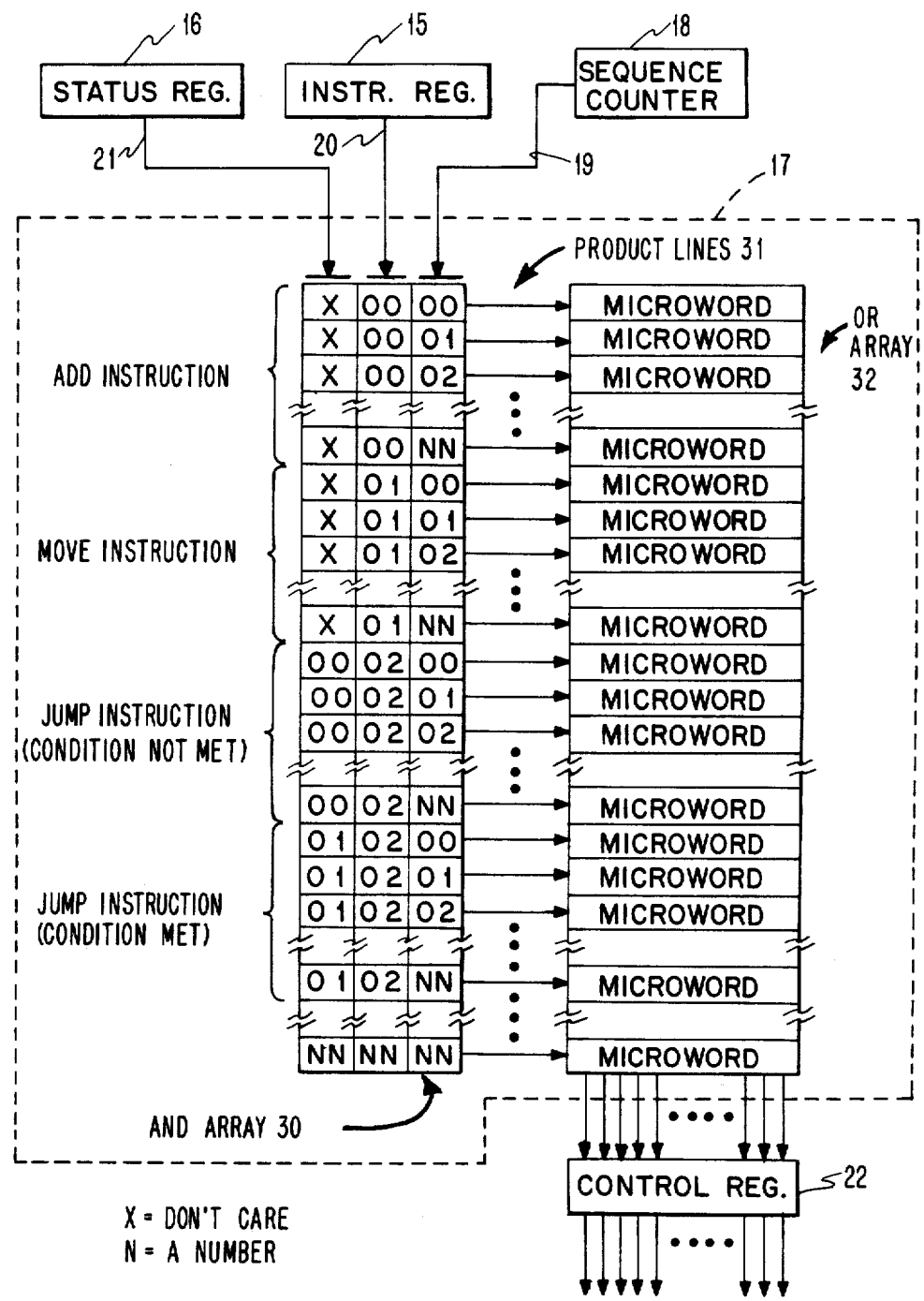
FIG. 2 shows in greater detail the construction of the programmable logic array (PLA) of FIG. 1.

Referring to FIG. 2, there is shown in greater detail the construction of the PLA 17 of FIG. 1. As there seen, the PLA 17 includes an AND array section 30, the output side of which is connected by multiple word lines or product lines 31 to the input side of an OR array section 32. The appropriate bit positions in status register 16 are connected by way of bus 21 to a first set of inputs of the AND array 30, the appropriate bit positions in instruction register 15 are connected by way of bus 20 to a second set of inputs of the AND array 30 and the various bit positions of the sequence counter 18 are connected by way of bus 19 to a third set of inputs of the AND array 30. For sake of simplicity, the customary bit partitioner located at the input of the AND array 30 is not shown. The output lines from the OR array 32 are connected to the control register 22.

The numbers shown in the AND array 30 are intended to represent, in a highly simplified manner, a representative personalization pattern for the AND array 30. For simplicity, decimal numbers are used in place of the actual binary numbers. Furthermore, only a few representative ones of the total set of processor instructions are represented in FIG. 2. As indicated in FIG. 2, an ADD processor instruction is assumed to have an operation code of 00, a MOVE processor instruction is assumed to have an operation code of 01 and a JUMP processor instruction is assumed to have an operation code of 02. The symbol "X" represents the "don't care" case where no interconnections are made between that set of input lines and the corresponding product line. The symbol "NN" represents some number having an appropriate value for the position at which the symbol is located. As such, it represents interconnections between input lines and a product line, as contrasted to the no interconnection "don't care" case. Each interconnection is formed by the presence of a transistor having one terminal connected to an input line and another terminal connected to a product line.

Activation of a particular one of the product lines 31 will cause a particular microword bit pattern to appear at the output of the OR array 32. The particular output bit pattern is determined by the pattern of interconnections of that particular product line to the various different OR array output lines. Each interconnection is formed by the presence of a transistor having one terminal connected to the product line and another terminal connected to an OR array output line.

For any given operation code, the sequence counter 18 supplies a sequence of consecutive numbers ranging from 00 to NN to the AND array 30. This causes the microwords for that particular operation code to appear at the output of the OR array 32 one at a time in a sequential manner.

For some operation codes, the AND array 30 ignores the status register 16. Two such operation codes are represented by the ADD and MOVE instructions shown in FIG. 2 wherein the "don't care" X's denote the ignoring of the status register 16. For other instructions, such as the JUMP instruction illustrated in FIG. 2, the status register 16 is not ignored and one or more of its status bits are used to control the selection of the microword to be supplied to the control register 22. The JUMP instruction shown is a so-called "jump on condition" instruction. If the condition is met, the jump is taken to a predetermined processor instruction. Otherwise, the next sequential processor instruction is fetched and set into the instruction register 15. As is indicated, a first set of microwords is provided if the condition is not met and a second set of microwords is provided if the condition is met. The status bits from the status register 16 determine which set of microwords is selected.

Figure 3:
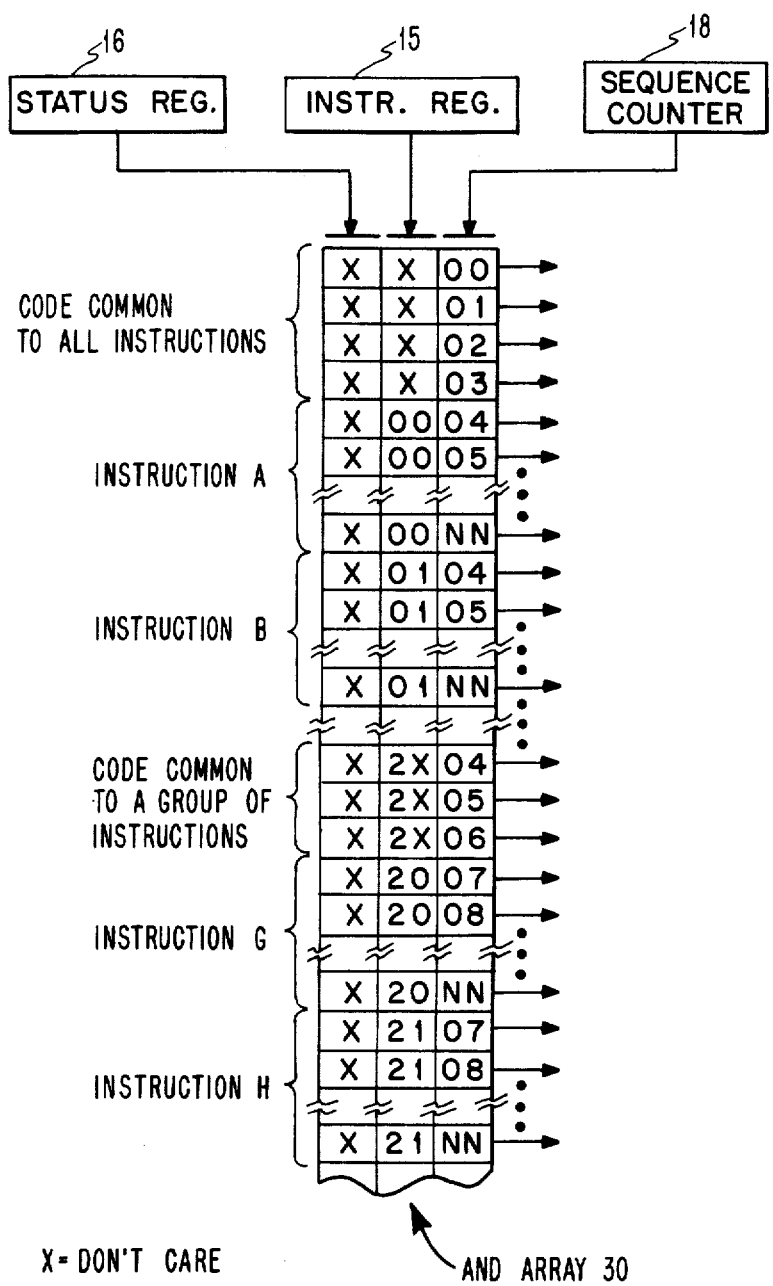
FIG. 3 shows an alternative form of construction for a portion of the PLA of FIG. 2.

FIG. 3 shows some alternative techniques which can be used for personalizing the AND array 30 to reduce the overall number of product lines and microwords which are needed. A first technique is represented by sequence counts 00 through 03. This represents the case where the first four microwords are always the same for all instructions in the processor instruction set. In this case, the AND array 30 ignores the instruction register 15 for the first four count values of the sequence counter 18, this being represented by the "don't care" X's in the corresponding instruction register positions in the AND array 30. When a sequence count value of 04 is reached, the AND array 30 commences to look at its input from the instruction register to determine the selection of the microword.

A somewhat similar technique can be used where a certain sequence of microwords is used as part of the microword sequence for several different processor instructions. This is represented in FIG. 3 by the operation code designation of 2X. The "2X" designates a group of operation codes having the same code value (2) for their higher order code bits and different code values (X) for their lower order code bits. For the microwords common to this 2X group, the AND array 30 ignores the lower order code bits represented by the X. Thus, for sequence counts 04, 05 and 06, the same three microwords are used for each of the different instructions in the 2X group. This use of the same microwords by different instructions reduces the number of product lines and, consequently, the number of microword locations in the OR array 32.

DESCRIPTION OF THE FIG. 4 EMBODIMENT

Figure 4:
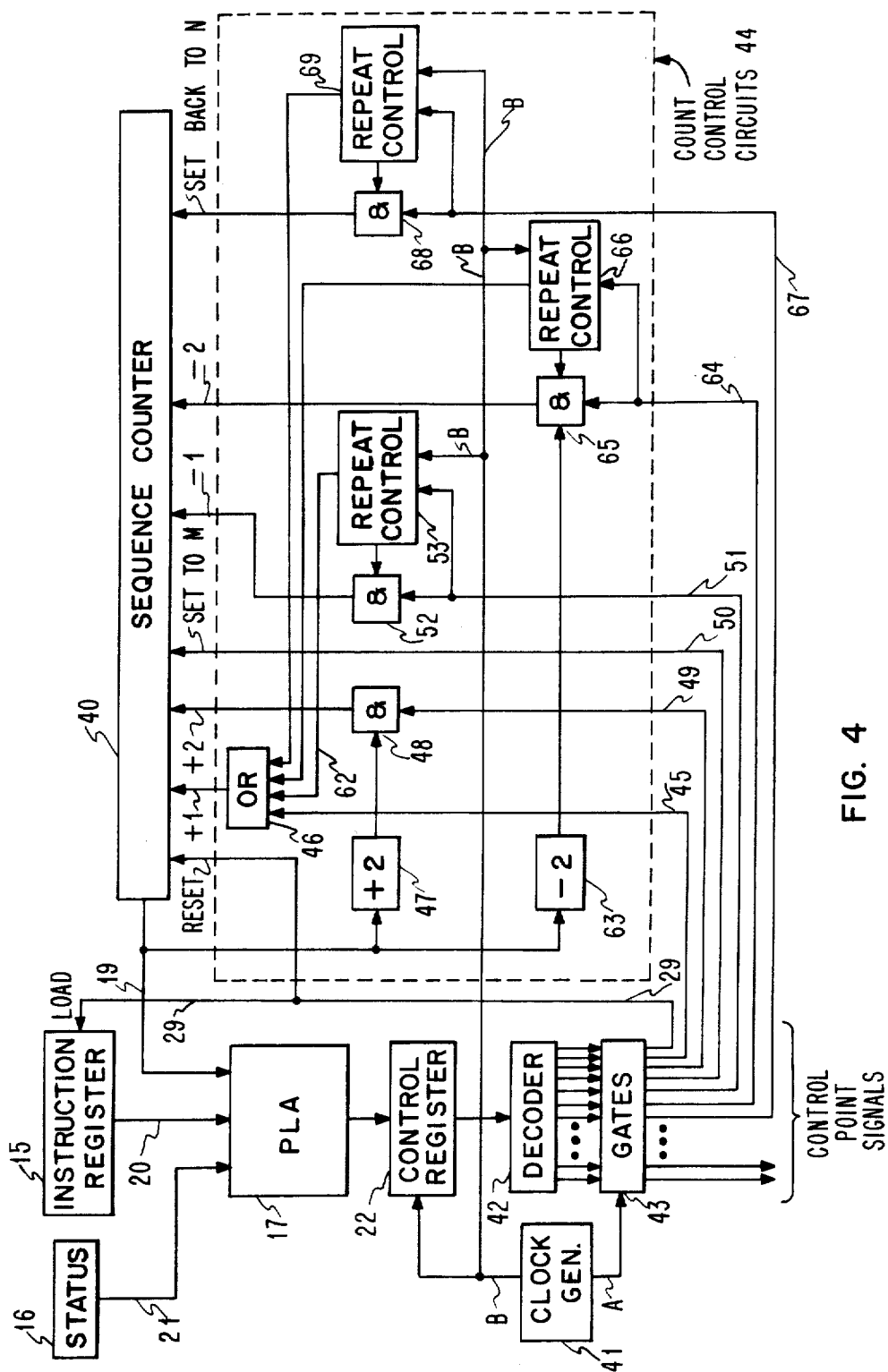
FIG. 4 is a functional block diagram of a further embodiment of a microword control mechanism constructed in accordance with the present invention.

Referring to FIG. 4, there is shown a functional block diagram of a further embodiment of a microword control mechanism constructed in accordance with the present invention. Elements which are the same as those shown in FIG. 2 are identified by the same reference numerals. The sequence counter 40 of FIG. 4 is generally the same as the sequence counter 18 of FIG. 1, except that the sequence counter 40 is a reversible or bidirectional binary counter, as opposed to the unidirectional binary counter 18 of FIG. 1. The clock generator 41 of FIG. 4 is a two-phase non-overlapping clock generator. It generates the A phase and B phase clock signals shown in FIG. 5. Both of these clock signals are of the same frequency and have the same wave shape, the difference being that they are displaced in time relative to one another. The positive pulses of the A clock do not overlap with the positive pulses of the B clock. The amount of non-overlap shown in FIG. 5 is exaggerated for purposes of clarity.

The decoder 42 and gate circuits 43 of FIG. 4 correspond in purpose to the decoder 23 of FIG. 1. In FIG. 1, the gating circuits are assumed to be included within the decoder 23, while, in FIG. 4, they are shown externally of the decoder 42 in order to give a specific example of the timing for the control point signals.

In the FIG. 4 embodiment, all control point signals occur during the positive pulse portions of the A clock signal. The control register 22, on the other hand, is loaded with a new microword during each of the positive pulse portions of the B clock signal. This separates in time the loading of the control register 22 and the changing of the inputs to the PLA 17. As a consequence, the control register 22 is not loaded during those time intervals when the PLA 17 is in the process of producing a new microword at its output. In FIG. 4, a new set of control point signals is produced for each of the positive A clock pulses, the nature of each set being determined by the coding of the microword then residing in the control register 22.

The microword control mechanism of FIG. 4 further includes count control circuitry 44 coupled to the primary control circuitry 22, 42, 43 and responsive to predetermined control point signals for changing the count in the sequence counter 40 for enabling the sequence counter 40 to provide the desired sequence of number signals via bus 19 to the PLA 17. This count control circuitry 44 includes circuitry responsive to a predetermined control point signal for incrementing the sequence counter 40 for increasing the count by a value of one. This circuitry for incrementing includes a control point signal line 45 and an OR circuit 46, the output of which is coupled to the +1 or "increment" input of the sequence counter 40.

In the present embodiment, a three-bit field in each microword is set aside for purposes of controlling the sequence counter 40. This is an encoded three-bit field and one particular three-bit code value is assigned for purposes of activating the increment control point line 45. When this particular three-bit code value is decoded by the decoder 42, the decoder 42 activates the increment control point line 45 during the occurrance of the A clock pulse. Thus, any microword set into the control register 22 and having this particular coding for the three-bit counter control field will cause the sequence counter 40 to be incremented by a count of one. The greater majority of microwords will, of course, have this particular coding and, hence, will cause an incrementing of the sequence counter 40.

The count control circuitry 44 also includes circuitry responsive to a predetermined control point signal for causing the sequence counter 40 to skip forward so that the next count to appear in the sequence counter is N counts higher than the current count. In the present example, N is equal to two and this circuitry for skipping forward includes an increment by two circuit 47, a set of AND gates 48 and a control point line 49. The increment by two circuit 47 receives the current number value in the sequence counter 40 and adds to it a constant value of two. The resulting plural-bit number is then supplied by way of a plural-bit set of AND gates 48 to the sequence counter 40 via the +2 bus to load the counter 40 in a parallel manner to a value two counts higher than its current value, provided the AND gates 48 are being enabled by a skip forward control point signal on the control point line 49.

This skipping mechanism 47, 48, 49 enables the next microword in a consecutive sequence of microwords to be omitted or skipped. For some similar type processor instructions, the overall sequence of microwords is the same except that one or two or a few isolated microwords in the overall sequence are used for one processor instruction and not for another. The skipping mechanism allows one and the same physical set of microwords to be used for both processor instructions, with the isolated microwords being skipped for the processor instruction that does not use them. The use of the skipping mechanism in this manner thus serves to reduce the number of product lines and microword locations required in the PLA 17.

The count control circuitry 44 further includes circuitry responsive to a predetermined control point signal for setting the sequence counter 40 to a predetermined count value M. This circuitry is represented by the control point line 50 which runs to the "Set to M" input of the sequence counter 40. This control point line 50 is connected to the various stages in the sequence counter 40 in the appropriate manner so that, when the control point line 50 is activated, it forces the sequence counter 40 to assume a count value of M. M is a fixed value and is not dependent on the current count value in the sequence counter 40.

If a setting forward action is desired, then the control point line 50 should be activated by a microword produced by a sequence counter count value of less than M. If a setting backward action is desired, then the microword which activates the "Set to M" control point line 50 should be a microword produced by a sequence count value which is greater than M.

It will sometimes be desirable to use additional "Set to M" control point lines for setting the sequence counter 40 to different values of M. As an example of the use of a pair of "Set to M" lines, assume that there is a "Set to M1" line and a "Set to M2" line, where M1 and M2 are different numbers. Assume that there is a special group of consecutive microwords which it is desired to use for two different processor instructions. The "Set to M1" mechanism can then be used to go to the start of this special group of microwords and the "Set to M2" mechanism can be activated by the last microword in this special group to return to and resume the original microword sequence. This enables the special group of microwords to be used by two different processor instructions, provided that the returned to microwords for the two processor instructions have the same sequence count values.

In general, during the execution of processor instructions residing in the instruction register 15, the manipulation of the data flow unit 11 may be identical for similar types of instructions, except for initial data set-up or the ending sequence of the individual instructions. The ability of the PLA 17 to set the sequence counter 40 to a value representing the microwords for the common manipulations to be performed by the separate instructions allows the AND array, the product lines and the OR array in the PLA 17 to be reduced since a common set of microwords will control the data flow unit 11 for more than one processor instruction.

The count control circuitry 44 further includes circuitry responsive to a predetermined control point signal for decrementing the sequence counter 40 for decreasing the count by a value of one. This circuitry includes a control point line 51 and an AND circuit 52, the output of which is coupled to a −1 "decrement" input of the sequence counter 40. The AND circuit 52 is normally in an enabled or active condition so as to pass the decrement control point signal to the sequence counter 40. Thus, the decoding of a microword having a decrement code value in the counter control field will cause the sequence counter 40 to be decremented by a count of one. Thus, the sequence counter 40 will back up one count to cause a repeat of the previous microword. This repeated microword causes the sequence counter 40 to be incremented by one to advance to the microword which caused the decrement. This causes the PLA 17 to again jump back to the preceding microword. Thus, if nothing further is done, the PLA 17 will continue to back up one microword, move forward one microword, back up one microword, etc.

In order to control this backing up and moving forward loop, the decrementing circuitry further includes repeat control circuitry 53 for disabling the setback action and instead incrementing the sequence counter 40 for the microword which produces the decrement signal after a predetermined number of repetitions of the setback or decrement action. The repeat control circuitry 53 is constructed to allow only a desired number of decrements of the sequence counter 40, after which the sequence counter 40 is caused to resume the normal movement in the forward direction.

A representative form of construction for the repeat control circuit 53 is shown in FIG. 6. The heart of this repeat control circuit 53 is a repeat counter 54 which counts via AND circuit 55 the number of occurrences of the repeat control point signal, in this case, the decrement control point signal on the control point line 51. The count capacity of the repeat counter 54 is constructed to correspond to the number of repeats that are desired. For example, if three repeats are desired, the repeat counter 54 is constructed to produce an overflow signal when it counts the third repeat signal on the control point line 51. This overflow signal deactivates AND circuit 56 via NOT circuit 57 and enables or activates AND circuit 58. As a result, the next B clock pulse sets a latch circuit 59. The binary one level signal at the output of latch circuit 59 is inverted by NOT circuit 60 to disable the normally active AND circuit 52 in the primary control point path. The binary one level at the output of latch circuit 59 also enables an AND circuit 61. As a consequence, the next occurring repeat signal on the control point line 51 is blocked by the AND circuit 52 and is instead passed by way of the AND circuit 61 and a signal line 62 to the OR circuit 46 (FIG. 4) which drives the increment input of the sequence counter 40. Thus, the counter 40 is incremented instead of decremented and moves on past the decrement microword to the microword having the next higher sequence count.

The repeat control point signal which is passed by the AND circuit 61 is also supplied to the reset terminal of the repeat counter 54. This resets the repeat counter 54 to a count of zero and removes the overflow signal from the output of the repeat counter 54. As a consequence, AND circuit 56 is again enabled and the AND circuit 58 is disabled. The next occurring B clock pulse is then passed by the AND circuit 56 to reset the latch circuit 59. This reenables the AND circuits 52 and 55 and disables the AND circuit 61. In this manner, the repeat control circuit 53 is restored to its initial condition to await the arrival of a future repeat control point signal on the control point line 51.

For the case where only one repeat of the preceding microword is desired, the repeat counter 54 becomes nothing more than a single stage latch circuit which is set by way of the AND circuit 55 and reset by way of the AND circuit 61. If a general decrement by one with no repeating of the decrement action is desired, then the repeat counter 54 should take the form of such a latch circuit. Additional decrement mechanisms like the decrement mechanism 51, 52, 53 of FIG. 4 may be used where decrement functions having different repeat numbers are required. If, on the other hand, no decrementing functions are required, then the sequence counter 40 need not have a decrement input and need not be of the reversible or bidirectional type.

The count control circuitry 44 further includes circuitry responsive to a predetermined control point signal for causing the sequence counter 40 to skip backward so that the next count to appear in the sequence counter as N counts lower than the current count. For sake of example only, N is assumed to have a value of two, in which case, the skip back circuitry includes a −2 or decrement by two circuit 63 for producing at its output a plural-bit binary number having a value two counts lower than the current count in the sequence counter 40, the binary number representing the current count being supplied to the input of −2 circuit 63. This skip back mechanism also includes a control point line 64 and a plural-bit set of AND gates 65. When the skip back control point line 64 is activated, the plural-bit output of the −2 unit 63 is supplied in a parallel manner to the sequence counter 40 to load this −2 value into the sequence counter 40. This, in effect, causes the sequence counter 40 to back up two counts.

The skip back mechanism further includes a repeat control circuit 66 for limiting the number of times the sequence counter 40 will skip back two counts. This repeat control circuit 66 may be of the same construction as the repeat control circuit 53 shown in FIG. 6. As such, the repeat counter therein is constructed to provide the desired number of repeats of the skip back action.

The skip back action is not limited to the case of skipping back two counts. The decrement circuit 63 can be modified to decrement the current count by a value of −N, where N is the number of counts it is desired to skip back. Also, where needed, additional skip back mechanisms like the mechanism 63–66 can be provided.

The count control circuitry 44 further includes circuitry responsive to a predetermined control point signal for setting the sequence counter 40 back to a predetermined count value which is less than the current count value for causing a selected portion of the microword sequence to be repeated. This set back mechanism includes a control point line 67 and an AND circuit 68, the output of which is connected in the appropriate manner to the various stages of the sequence counter 40 so that, when the control point line 67 is activated, the sequence counter 40 is forced to the desired count value N.

After the sequence counter 40 is set back to the desired value, the corresponding microword to which the PLA 17 is set back is read out and executed. This microword causes an incrementing of the sequence counter 40 to produce the next consecutive microword. This next consecutive microword also increments the sequence counter 40. This incrementing of the sequence counter 40 is continued for each successive microword until the microword is again reached which contains the set back code value in its counter control field. This sets the sequence counter 40 back to a count of N for the second time to again repeat the intervening sequence of microwords.

The number of times the intervening set of microwords is allowed to be repeated is determined by a repeat control circuit 69. Repeat control circuit 69 is of the same construction as is the repeat control circuit 53, shown in FIG. 6. The repeat counter in circuit 69 is constructed to allow the desired number of repeats of the selected sequence of microwords.

Both the skip back mechanism 63–66 and the set back mechanism 67–69 provide a looping action for enabling a selected portion of the microword sequence for a given processor instruction to be repeated a desired number of times. The primary difference between these two mechanisms is that the skip back mechanism skips back a certain number of counts relative to the current sequence count, while the set back mechanism just sets the sequence counter 40 back to some predetermined value without regard to the current count value in the sequence counter 40. Both mechanisms enable a given set of microwords to be used two or more times for a given processor instruction and, thus, serve to reduce the overall number of microwords needed in the PLA 17 and, hence, the size of the PLA 17.

Additional set back mechanisms like the mechanism 67, 68, 69 may be provided where needed for use with other processor instructions.

All of the different skipping, setting, looping and decrementing mechanisms shown in FIG. 4 need not be used in any given data processor. A given data processor may need, for example, only a skip forward (+2) mechanism and a set back to N looping mechanism. In this case, the set to M mechanism, the decrement (−1) mechanism, and the skip back (−2) mechanism would be omitted from the count control circuitry 44. It is assumed that all data processors will need an incrementing (+1) mechanism.

The microword control mechanism of FIG. 4 further includes circuitry responsive to a control point signal for causing the next processor instruction to be supplied to the instruction register 15 and for resetting the sequence counter 40 to its initial count or zero value. In the present embodiment, this circuitry is represented by the control point line 29, which is connected to the load terminal of the instruction register 15 and to the reset terminal of the sequence counter 40. In the present embodiment, the microword which produces this load and reset control point signal on line 29 is the last microword in the microword sequence for each and every one of the processor instructions. Thus, the last microword for each instruction loads the operation code for the next instruction into the instruction register 15 and resets the sequence counter 40 to a count value of zero.

DESCRIPTION OF THE FIG. 7 EMBODIMENT

Figure 7:
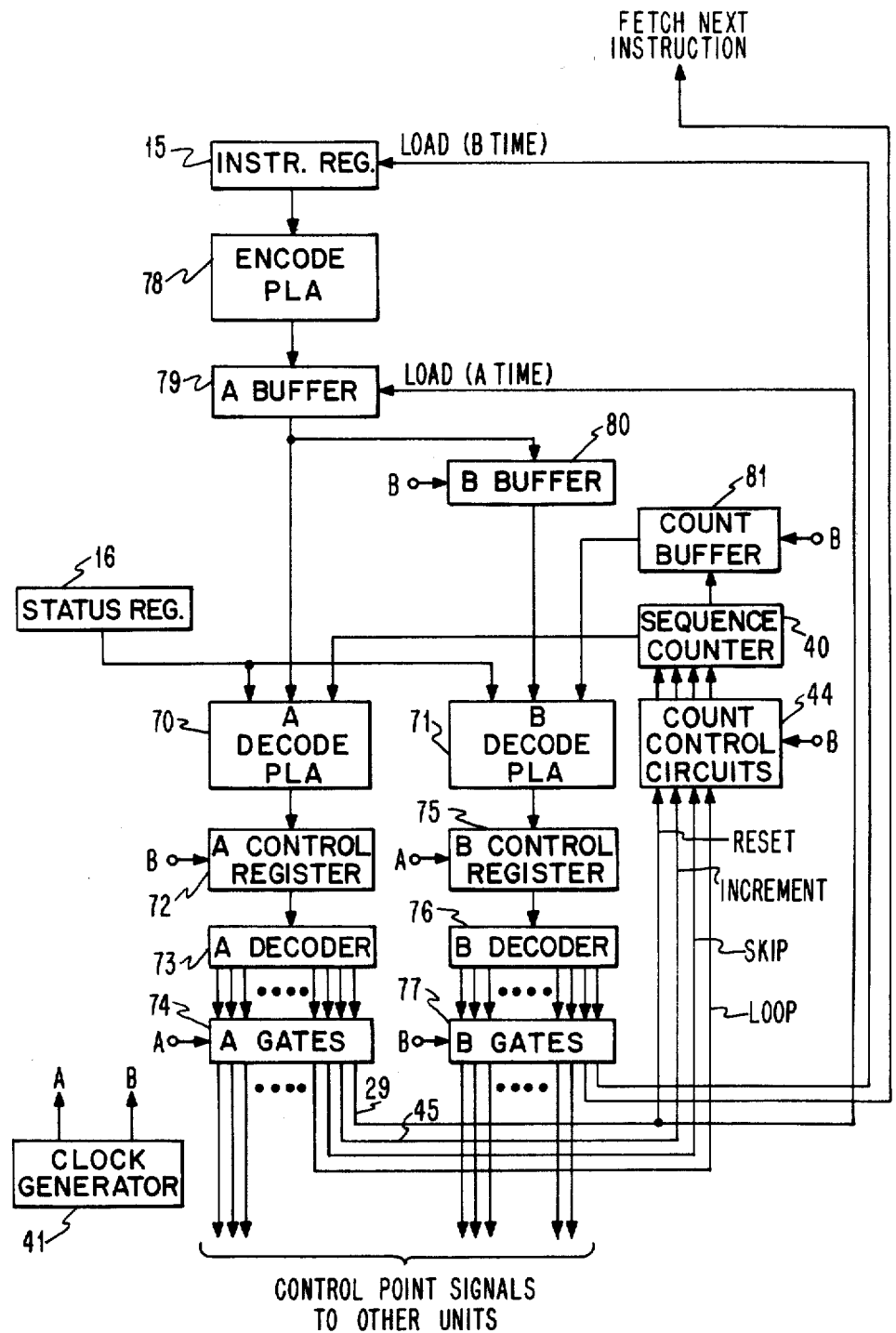
FIG. 7 is a functional block diagram of another embodiment of a microword control mechanism constructed in accordance with the present invention.

Referring to FIG. 7, there is shown a functional block diagram of another embodiment of a microword control mechanism constructed in accordance with the present invention. This embodiment makes use of a programmable logic array mechanism which includes a plurality of programmable logic arrays, each of which operates to produce microwords. This plurality of PLA's is represented by an A decode PLA 70 and a B decode PLA 71. Each includes approximately one-half of the needed microwords.

The primary control circuitry represented by the control registers, the decoders and the decoder output gates is operated in a time multiplexed manner to enable the microwords from the A decode PLA 70 and the B decode PLA 71 to take turns in producing the control point signals. In particular, the microwords from the A decode PLA 70 produce control point signals during the positive A clock intervals, while the microwords from the B decode PLA 71 produce control point signals during the positive B clock intervals. As seen from FIG. 5, these positive clock intervals are interleaved so that the control point signals are alternately produced by the A decode PLA 70 and the B decode PLA 71.

The primary control circuitry for the A decode PLA 70 includes an A control register 72, an A decoder 73 and A gates 74. The A control register 72 is loaded by the positive B clock pulses, while the A gates 74 are enabled by the positive A clock pulses.

The primary control circuitry for the B decode PLA 71 includes a B control register 75, a B decoder 76 and B gates 77. The B control register 75 is loaded by the positive A clock pulses, while the B gates 77 are enabled by the positive B clock pulses.

In FIG. 7, an encode PLA 78 and an A buffer 79 are connected in cascade between the instruction register 15 and the input of the A decode PLA 70. The encode PLA 78 is a relatively small PLA which is used to convert the operation code bits from the instruction register 15 into an instruction dependent signal having a lesser number of bits. The instruction dependent signal appearing at the output of encode PLA 78 is, however, uniquely representative of the operation code bits which produced it. Reducing the number of instruction dependent bits in this manner reduces the number of input lines required in the AND arrays of each of the A and B decode PLA's 70 and 71, hence, reducing the size of these PLA's. This technique is particularly useful for the case of processor instructions wherein the number and location of the "effective" operation code bits may vary from instruction to instruction.

The plural-bit instruction dependent signal residing in the A buffer 79 is supplied to the input of the B decode PLA 71 by way of a B buffer 80. The use of the A and B buffers 79 and 80 enables the providing of the different timings needed for the A and B decode PLA's 70 and 71. The loading of the A buffer 79 occurs during a positive A clock interval, while the loading of the B buffer 80 occurs during a positive B clock interval. This adjusts the operations of the A and B decode PLA's 70 and 71 so that they are properly in step with the timings of their respective A and B control registers 72 and 75.

The sequence counter 40 and the count control circuits 44 operate in the same manner as described in connection with FIG. 4. The plural-bit binary numbers produced by the sequence counter 40 are supplied directly to the input of the A decode PLA 70. These same plural-bit binary numbers are supplied to the B decode PLA 71 by way of a count buffer register 81. Count buffer register 81 is loaded during the positive B clock interval, the same as is the B buffer 80. This puts the timing for the sequence count numbers in step with the instruction dependent signals insofar as the input of the B decode PLA 71 is concerned.

The sequence counter 40 and the count control circuitry 44 provide the same benefits for the FIG. 7 embodiment as they did for the FIG. 4 embodiment. In particular, they enable the various skipping and looping actions which, in the present embodiment, can be used to reduce the number of microwords needed in the A and B decode PLA's 70 and 71. This enables a reduction in size of these PLA's 70 and 71 and, hence, a corresponding increase in their speed of operation.

Figure 8:
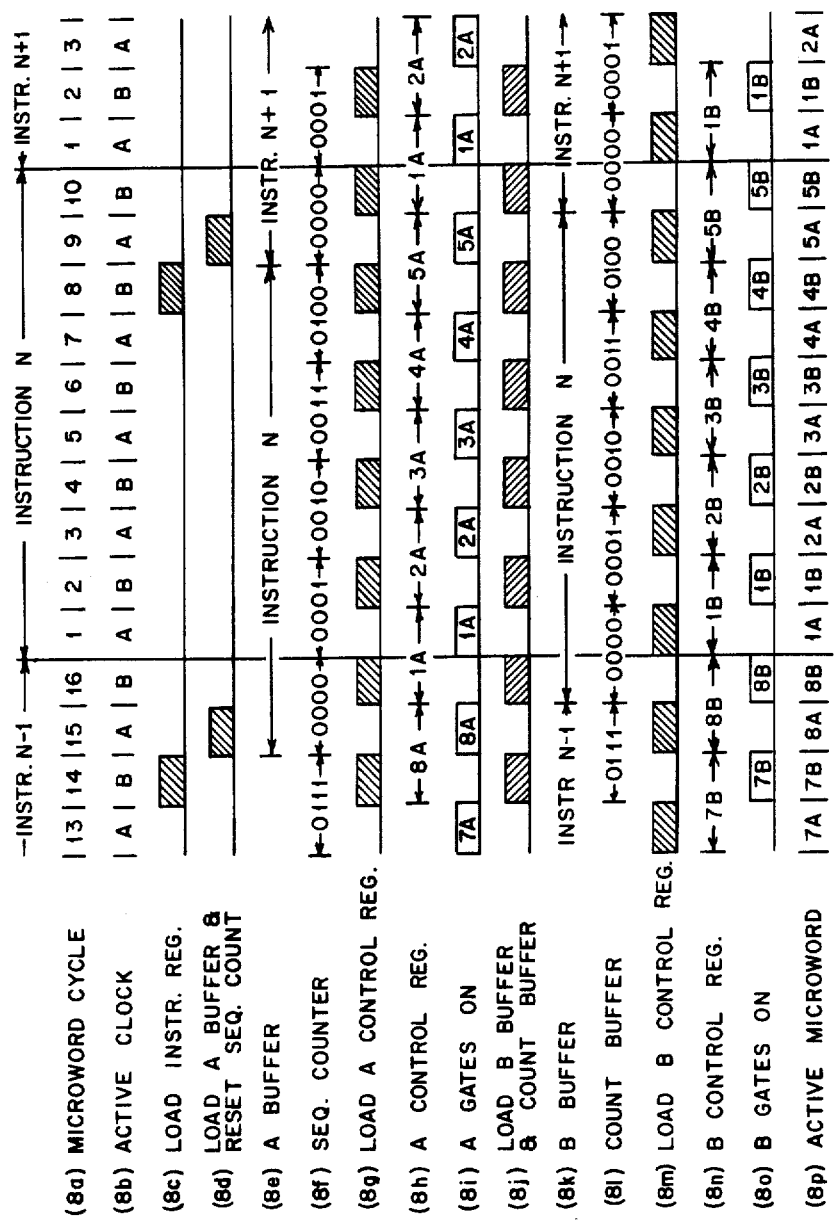
FIG. 8 is a timing diagram used in explaining the operation of the microword control mechanism of FIG. 7.

FIG. 8 is a timing diagram which shows a typical operation of the microword control mechanism of FIG. 7. FIG. 8 shows the complete operations for a representative instruction N plus the last few operations for the preceding instruction N−1 and the first few operations for the following instruction N+1. Instruction N is assumed to require ten microwords for its execution. The microwords obtained from the A decode PLA 70 are designated as microwords 1A, 2A, 3A, 4A and 5A. The microwords obtained from the B decode PLA 71 are designated as 1B, 2B, 3B, 4B and 5B. As indicated by line (8p) of FIG. 8, these microwords appear at the outputs of A and B gates 74 and 77 in an alternating manner with 1A being first, then 1B, then 2A, then 2B, etc.

For simplicity of illustration, no gaps are shown between the A clock intervals and B clock intervals in FIG. 8. It is to be understood, however, that small time gaps do exist and that all A interval operations are completed before B interval operations are commenced, and vice versa.

As indicated by line (8d) of FIG. 8, instruction N is loaded into the A buffer 79 and the sequence counter 40 is reset to zero by a control point signal (control point line 29) occurring during the next to the last microword cycle (cycle 15) of the preceding instruction N−1. This gives the proper amount of time for the first instruction N microword (1A) to be produced by the A decode PLA 70 and loaded into the A control register 72. Hence, the proper control point signals are ready and waiting at the inputs of the A gates 74 at the beginning of the interval for instruction N.

The FIG. 8 example assumes only an incrementing of the sequence counter 40. This is accomplished by way of the control point line 45, which runs from an output terminal of the A gates 74 to the increment input terminal of the count control circuits 44. Thus, as indicated by lines (8f) and (8i) of FIG. 8, each time the A gates 74 are enabled or turned on, the sequence counter 40 is incremented. As indicated by line (8l) of FIG. 8, the count in count buffer 81 follows the count in the sequence counter 40 except that it is delayed by one microword cycle relative to the count in sequence counter 40.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a microprogrammed data processor wherein a sequence of microwords are used to control the execution of each processor instruction, an improved microword control mechanism comprising:
   circuitry responsive to the processor instruction to be executed for providing an instruction dependent signal uniquely representative of such instruction;
   sequence counter circuitry for supplying a sequence of number signals;
   and a programmable logic array responsive to the instruction dependent signal and to the sequence of number signals for producing a sequence of microwords needed to execute the instruction.

2. In a microprogrammed data processor wherein a sequence of microwords are used to control the execution of each processor instruction, an improved microword control mechanism comprising:
   instruction responsive circuitry responsive to the processor instruction to be executed for providing an instruction dependent plural-bit signal having a coding uniquely representative of such instruction;
   a plural-bit sequence counter;
   a programmable logic array jointly responsive to the instruction dependent signal and to the count in the sequence counter for producing a microword needed to execute the instruction; and
   circuitry for periodically changing the count in the sequence counter for causing the programmable logic array to produce additional microwords needed to execute the instruction.

3. An improved microword control mechanism in accordance with claim 2 wherein the circuitry for periodically changing the count in the sequence counter includes circuitry for incrementing the sequence counter for increasing the count by a value of one.

4. An improved microword control mechanism in accordance with claim 2 wherein the circuitry for periodically changing the count in the sequence counter includes circuitry for decrementing the sequence counter for decreasing the count by a value of one.

5. An improved microword control mechanism in accordance with claim 2 wherein the circuitry for periodically changing the count in the sequence counter includes circuitry for causing the sequence counter to skip forward so that the next count to appear in the sequence counter is N counts higher than the current count, where N is a number equal to or greater than two.

6. An improved microword control mechanism in accordance with claim 2 wherein the circuitry for periodically changing the count in the sequence counter includes circuitry for causing the sequence counter to skip backward so that the next count to appear in the sequence counter is N counts lower than the current count, where N is a number equal to or greater than two.

7. An improved microword control mechanism in accordance with claim 2 wherein the circuitry for periodically changing the count in the sequence counter includes circuitry for setting the sequence counter to a predetermined count which is different from both the initial starting count and the current count.

8. An improved microword control mechanism in accordance with claim 2 wherein the circuitry for periodically changing the count in the sequence counter includes:
   circuitry for incrementing the sequence counter for increasing the count by a value of one;
   circuitry for causing the sequence counter to skip so that the next count to appear in the sequence counter is N counts different from the current count, where N is a number equal to or greater than two; and
   circuitry for setting the sequence counter to a predetermined count which is different from both the initial starting count and the current count.

9. An improved microword control mechanism in accordance with claim 2 wherein the circuitry for periodically changing the count in the sequence counter includes:
   circuitry for normally effecting such periodic changes by incrementing the sequence counter by a value of one; and
   selectively operable circuitry for setting the sequence counter back to a count which is less than the current count for causing a portion of the microword sequence to be repeated.

10. An improved microword control mechanism in accordance with claim 2 wherein the circuitry for periodically changing the count in the sequence counter includes:
    circuitry for normally effecting such periodic changes by incrementing the sequence counter by a value of one;
    circuitry operative in response to the occurrence of a predetermined microword for setting the sequence counter back to a count which is less than the current count for causing a plurality of repetitions of a portion of the microword sequence; and
    repeat control circuitry for discontinuing such repetitions after a predetermined number of such repetitions.

11. In a microprogrammed data processor wherein a sequence of microwords are used to control the execution of each processor instruction, an improved microword control mechanism comprising:
    instruction responsive circuitry responsive to a processor instruction to be executed for providing an instruction dependent plural-bit signal having a coding uniquely representative of such instruction;
    a plural-bit sequence counter;
    a programmable logic array jointly responsive to the instruction dependent signal and to the count in the sequence counter for producing a microword needed to execute the instruction;
    circuitry operative after a microword is produced by the programmable logic array for changing the count in the sequence counter for causing the programmable logic array to produce another microword; and
    circuitry operative after a predetermined number of microwords have been produced by the programmable logic array for causing the next processor instruction to be supplied to the instruction responsive circuitry and for resetting the sequence counter to an initial count value.

12. In a microprogrammed data processor wherein a sequence of microwords are used to control the execution of each processor instruction, an improved microword control mechanism comprising:
- instruction responsive circuitry responsive to a processor instruction to be executed for providing an instruction dependent plural-bit signal having a coding uniquely representative of such instruction;
- plural-bit sequence counter circuitry for supplying a sequence of number signals;
- a programmable logic array mechanism responsive to the instruction dependent signal and to the number signals for producing a sequence of microwords needed to execute the instruction;
- primary control circuitry responsive one at a time to the microwords from the programmable logic array mechanism for producing for each microword a plurality of control point signals for controlling the operation of the data processor for one microword cycle;
- count control circuitry coupled to the primary control circuitry and responsive to predetermined control point signals for changing the count in the sequence counter circuitry for enabling same to provide the sequence of number signals;
- circuitry responsive to a control point signal for a predetermined microword for causing the next processor instruction to be supplied to the instruction responsive circuitry; and
- circuitry responsive to a control point signal for a predetermined microword for resetting the sequence counter circuitry to an initial count value.

13. An improved microword control mechanism in accordance with claim 12 wherein the instruction responsive circuitry includes:
- a plural-bit instruction register for receiving at least a part of the processor instruction; and
- circuitry for supplying at least some of the instruction bits in such instruction register to the programmable logic array mechanism to provide thereto the instruction dependent signal.

14. An improved microword control mechanism in accordance with claim 12 wherein the instruction responsive circuitry includes:
- an encode programmable logic array responsive to a predetermined number of bits in the processor instruction for producing an instruction dependent signal having a lesser number of bits but with a coding which is uniquely representative of the instruction; and
- circuitry for supplying the instruction dependent signal produced by the encode programmable logic array to the programmable logic array mechanism.

15. An improved microword control mechanism in accordance with claim 12 wherein:
- the programmable logic array mechanism includes a plurality of programmable logic arrays, each of which operates to produce microwords;
- and the primary control circuitry includes circuitry for enabling the microwords from the different programmable logic arrays to take turns in producing the control point signals.

16. An improved microword control mechanism in accordance with claim 12 wherein the count control circuitry includes circuitry responsive to a predetermined control point signal for incrementing the sequence counter for increasing the count by a value of one.

17. An improved microword control mechanism in accordance with claim 12 wherein the count control circuitry includes circuitry responsive to a predetermined control point signal for decrementing the sequence counter for decreasing the count by a value of one.

18. An improved micoword control mechanism in accordance with claim 12 wherein the count control circuitry includes circuitry responsive to a predetermined control point signal for causing the sequence counter to skip forward so that the next count to appear in the sequence counter is N counts higher than the current count, where N is a number equal to or greater than two.

19. An improved microword control mechanism in accordance with claim 12 wherein the count control circuitry includes circuitry responsive to a predetermined control point signal for causing the sequence counter to skip backward so that the next count to appear in the sequence counter is N counts lower than the current count, where N is a number equal to or greater than two.

20. An improved microword control mechanism in accordance with claim 12 wherein the count control circuitry includes circuitry responsive to a predetermined control point signal for setting the sequence counter to a predetermined count which is different from both the initial starting count and the current count.

21. An improved microword control mechanism in accordance with claim 12 wherein the count control circuitry includes:
- circuitry responsive to a predetermined control point signal for incrementing the sequence counter for increasing the count by a value of one;
- circuitry responsive to a predetermined control point signal for causing the sequence counter to skip so that the next count to appear in the sequence counter is N counts different from the current count, where N is a number equal to or greater than two; and
- circuitry responsive to a predetermined control point signal for setting the sequence counter to a predetermined count which is different from both the initial starting count and the current count.

22. An improved microword control mechanism in accordance with claim 12 wherein the count control circuitry includes:
- circuitry responsive to an increment control point signal produced for each of a predetermined number P of successive microwords for incrementing the sequence counter by a value of one for each such microword;
- circuitry responsive to a repeat control point signal produced for the microword Q next following the P successive microwords for setting the sequence counter back to a count less than but not more than P less than the current count for causing a selected portion of the microword sequence to be repeated; and
- repeat control circuitry for disabling the setback action and instead incrementing the sequence counter for the microword Q after a predetermined number of repetitions of the selected portion of the microword sequence.

* * * * *